US011321375B2

(12) United States Patent
Margolin et al.

(10) Patent No.: US 11,321,375 B2
(45) Date of Patent: May 3, 2022

(54) TEXT OBJECT MANAGEMENT SYSTEM

(71) Applicant: PayPal, Inc., San Jose, CA (US)

(72) Inventors: Itay Margolin, Pardesiya (IL); Tomer Handelman, Ramat-Gan (IL)

(73) Assignee: PayPal, Inc., San Jose, CA (US)

( * ) Notice: Subject to any disclaimer, the term of this patent is extended or adjusted under 35 U.S.C. 154(b) by 22 days.

(21) Appl. No.: 16/908,187

(22) Filed: Jun. 22, 2020

(65) Prior Publication Data
US 2021/0397636 A1 Dec. 23, 2021

(51) Int. Cl.
G06F 16/35 (2019.01)
G06F 16/31 (2019.01)

(52) U.S. Cl.
CPC ............ *G06F 16/35* (2019.01); *G06F 16/313* (2019.01)

(58) Field of Classification Search
CPC ................................ G06F 16/35; G06F 16/313
See application file for complete search history.

(56) References Cited

U.S. PATENT DOCUMENTS

| 7,958,067 | B2 | 6/2011 | Schmidtler et al. | |
| 9,672,827 | B1* | 6/2017 | Jheeta | G10L 15/32 |
| 2007/0239715 | A1 | 10/2007 | DeBie | |
| 2015/0302338 | A1* | 10/2015 | Zaveri | H04L 67/10 705/7.39 |
| 2017/0109438 | A1* | 4/2017 | Oliver | G06F 16/334 |
| 2017/0220359 | A1* | 8/2017 | Aguilar-Gamez | G06F 3/0484 |
| 2018/0285362 | A1* | 10/2018 | McCoy | G06Q 10/10 |
| 2018/0357511 | A1* | 12/2018 | Misra | G06K 9/623 |
| 2019/0379625 | A1 | 12/2019 | Coffey et al. | |
| 2020/0159829 | A1* | 5/2020 | Zhao | G06T 11/206 |
| 2021/0182294 | A1* | 6/2021 | Teen | G06F 16/24542 |

OTHER PUBLICATIONS

Yutaka Sasaki, "Automatic Text Classification," NaCTeM, School of Computer Science, 57 pages, 2008 Yutaka Sasaki, University of Manchester.

(Continued)

*Primary Examiner* — Dangelino N Gortayo
(74) *Attorney, Agent, or Firm* — Haynes and Boone, LLP

(57) ABSTRACT

Systems and methods are disclosed for managing data objects that include text content that are stored in a database. The management of text objects includes determining that a condition for a data object associated with a user has been satisfied. In response, a relevancy score for the data object is generated. The relevancy score is based on the text content of the data object and a density estimation model associated with the user. The density estimation is generated using a plurality of data objects that each include text content and that are associated with a plurality of users of a service associated with the data objects, and using a set of the plurality of data objects that are associated with the user. Irrelevancy actions or relevancy actions may be performed to the data object based on the relevancy score.

20 Claims, 12 Drawing Sheets

(56) References Cited

OTHER PUBLICATIONS

Anne Kao and Stephen R. Poteet, "Natural Language Processing and Text Mining," Chutima Boonthum, Irwin B. Levinstein, and Danielle S. McNamara, "Evaluating Self-Explanations in iSTART: Word Matching, Latent Semantic Analysis, and Topic Models," Content 6, pp. 91-106, British Library Cataloguing in Publication Data, Library of Congress Control No. 2006927721, ISBN-10: 1-84628-175-X, ISBN-13: 978-1-84628-175-4, © Springer-Verlag London Limited 2007.

Anne Kao and Stephen R. Poteet, "Natural Language Processing and Text Mining," Mauritius A. R. Schmidtler, and Jan W. Amtrup, "Automatic Document Separation: A Combination of Probabilistic Classification and Finite-State Sequence," Content 8, pp. 123-144, Modeling British Library Cataloguing in Publication Data, Library of Congress Control No. 2006927721, ISBN-10: 1-84628-175-X, ISBN-13: 978-1-84628-175-4, © Springer-Verlag London Limited 2007.

Savic, Dobrica, "Automatic Classification of Office Documents: Review of Available Methods and Techniques," 18 pages, Find Article > ARMA Records Management Quarterly> Oct 1995 > Article, Powered by BNET.com Manana Khachidze, Magda Tsintsadze, Andmaia Archuadze, "Natural Language Processing Based Instrument for Classification of Free Text Medical Records," Hindawi Publishing Corporation, BioMed Research International, vol. 2016, Article ID 8313454, 10 pages, http://dx.doi.org/10.1155/2016/8313454.

Nathaniel Payne, Jason R. Baron, "Auto-Categorization Methods for Digital Archives," IEEE Computational Archival Science Workshop, 38 pages, Dec. 13, 2017.

* cited by examiner

| WORD | NUMBER OF OCCURRENCES |
|---|---|
| TOMER | 12 |
| GREETINGS | 2981 |
| IS | 2000 |
| ALGORITHM | 5000 |
| DEEP | 240 |
| LEARNING | 100 |
| PROJECTX | 15 |
| ITAY | 30 |
| MY | 40000 |
| NAME | 15500 |
| ⋮ | |
| NTH WORD | *** |

FIG. 4

| 500 | TOMER | GREETINGS | IS | ALGORITHM | DEEP | LEARNING | PROJECTX | ITAY | MY | NAME | ··· NTH WORD |
|---|---|---|---|---|---|---|---|---|---|---|---|
| FIRST USER 504a | 2 | 1 | 4 | 4 | 4 | 4 | 4 | 0 | 1 | 1 | |
| SECOND USER 504b | 0 | 2 | 3 | 3 | 3 | 3 | 2 | 2 | 0 | 1 | |
| ··· NTH USER 504c | | | | | | | | | | | |

FIG. 5

|  | VALUE1 | VALUE2 |
|---|---|---|
| TOMER | -0.3 | 0.7 |
| GREETINGS | 1.2 | 0.4 |
| IS | -3.5 | -3.5 |
| ALGORITHM | 0.2 | 0.1 |
| DEEP | 0.3 | 0.4 |
| LEARNING | 0.2 | 0.13 |
| PROJECTX | 1.1 | 1.1 |
| ITAY | 6 | 6.2 |
| MY | -3 | -4 |
| NAME | -6 | -6 |
| ⋮ | | |
| NTH WORD | *** | *** |

FIG. 6

|         | VALUE1 | VALUE2 |
|---------|--------|--------|
| TOMER   | -0.3   | 0.7    |
| GREETINGS | 1.2  | 0.4    |
| IS      | -3.5   | -3.5   |
| IS      | -3.5   | -3.5   |
| ALGORITHM | 0.2  | 0.1    |
| ALGORITHM | 0.2  | 0.1    |
| DEEP    | 0.3    | 0.4    |
| DEEP    | 0.3    | 0.4    |
| LEARNING | 0.2   | 0.13   |
| LEARNING | 0.2   | 0.13   |
| PROJECTX | 1.1   | 1.1    |
| PROJECTX | 1.1   | 1.1    |
| MY      | -3     | -4     |
| NAME    | -6     | -6     |
| ...     |        |        |
| NTH WORD | ***   | ***    |

|  | val1 | val1 |
|---|---|---|
| My | -3 | -4 |
| Name | -6 | -6 |
| Is | -3.5 | -3.5 |
| Itay | 6 | 6.2 |
| Algorithm | .2 | .1 |

1102a, 1102b (columns)
1104a, 1104b, 1104c, 1104d, 1104e (rows)

TEXT OBJECT MANAGEMENT SYSTEM

FIELD OF INVENTION

The present specification generally relates to data object management, and more specifically to managing a database of data objects that include text content according to various embodiments of the disclosure.

BACKGROUND

Data objects that include textual content are often generated by services and applications in computer systems and computer networks for various reasons. For example, in an electronic mail service, various users may generate, send, and receive email communications. While some users may delete, archive, or otherwise manage these email communications to save space and resources in the email database, many users often do not perform any management actions on their email communications and let their emails accumulate regardless of whether the emails are important to the user such that the user may reference the email again or not. Storing the emails in the email database and never deleting the emails is costly, especially for enterprises with a large number of employees and/or users of the electronic mail service. One solution is to keep the emails for a period of time and after the period of time has lapsed (e.g., one year), delete the email. However, users may not know in advance which emails will be relevant to them in the future. As such, users of the electronic mail service that do not archive their emails may have relevant emails deleted after the period time has lapsed. Thus, a problem exists with regard to managing data objects in a database to maximize database storage and minimize relevant data object loss.

BRIEF DESCRIPTION OF FIGURES

FIG. 4 is a table illustrating a text object dictionary generated during the method of FIG. 3 according to an embodiment of the present disclosure;

FIG. 5 is a table illustrating a cross-user matrix generated during the method of FIG. 3 according to an embodiment of the present disclosure;

FIG. 6 is a table illustrating a text embedded matrix generated during the method of FIG. 3 according to an embodiment of the present disclosure;

FIG. 7 is a table illustrating a user text-interest matrix generated during the method of FIG. 3 according to an embodiment of the present disclosure;

FIG. 11 is a table illustrating a text embedded matrix for the text object being managed during the method of FIG. 10 according to an embodiment of the present disclosure.

Figure 1:
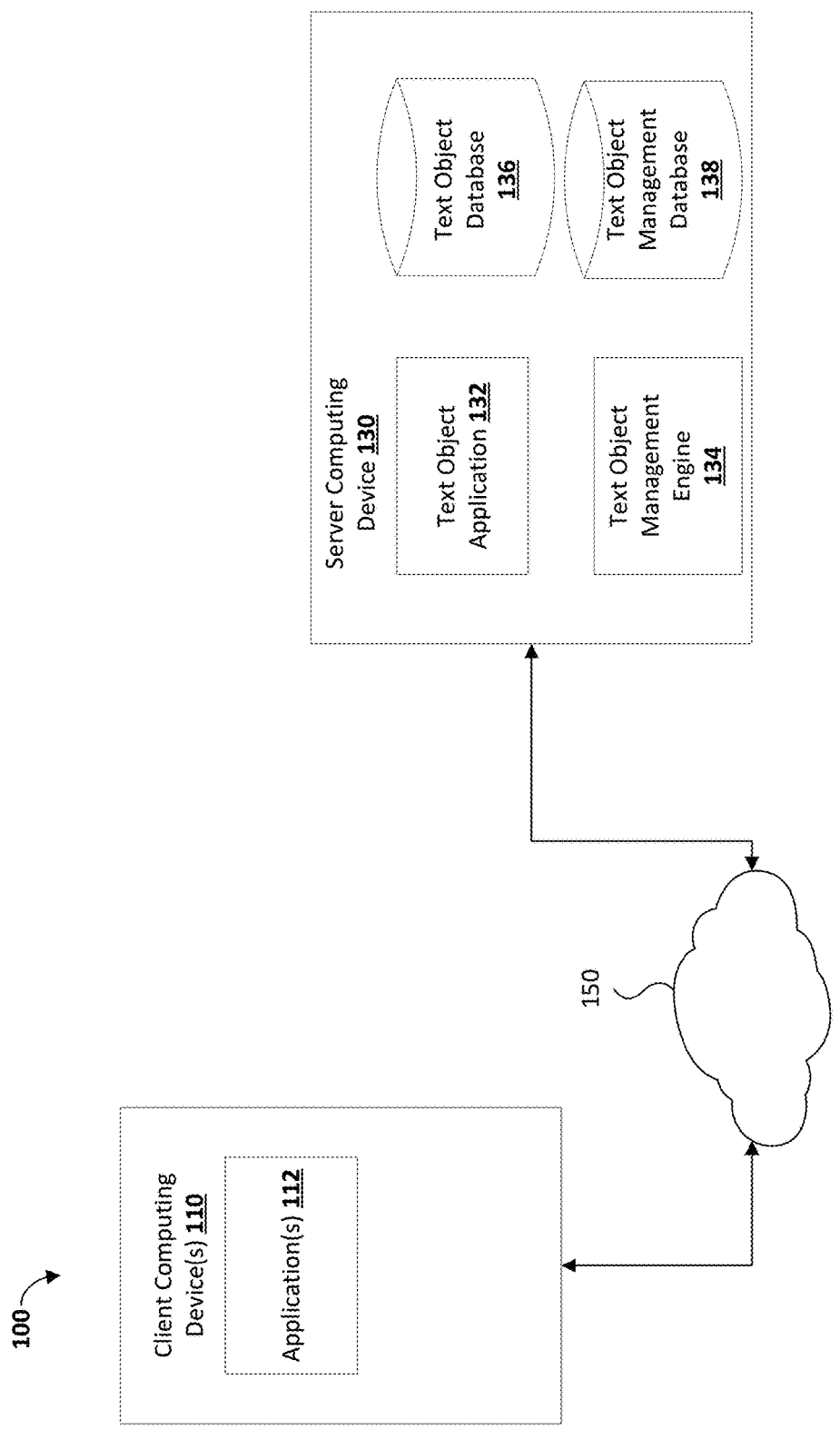
FIG. 1 is a block diagram illustrating a networked system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and system for managing data objects (e.g., electronic files, electronic documents, electronic messages, etc.) that include text content (e.g., letters, words, phrases, etc. that include alphanumeric characters). The data objects that include text content may also be referred to herein as text objects. As discussed above, text objects associated with an application or service may be stored in a database indefinitely even if the text object is irrelevant to the user(s) the text object is associated with. As such, some text objects, if not managed manually by a user or group of users, may collectively consume a large amount of storage resources even though those text objects may never be accessed by an associated user or may only be accessed by mistake when the user is searching for a relevant text object According to various embodiments of the disclosure, a text object management system may monitor a text object database to determine whether a condition for a text object (e.g., an email) associated with a user has been satisfied. If the condition is satisfied, a relevancy score for the text object may be generated. The relevancy score may be based on the text content of the first data object and an unsupervised density estimation model. For example, a text embedded matrix for the text object that includes vectorized values for each word in the text object may be generated and compared to the unsupervised density estimation model. The unsupervised density estimation model may have been generated using a plurality of text objects that are associated with a plurality of users of a service associated with the text objects and using a set of the plurality of text objects that are associated with the user associated with the text object.

For example, the plurality of text objects may be used to build a text object dictionary that indicates the number times each word in the text object dictionary is used by all of the users of the service. Using the text object dictionary and the set of the plurality of text objects, a cross-user matrix may be generated that indicates for that user of the service the number of text objects, associated with the user, that include at least an instance of each word in the text object dictionary. Furthermore, the text object dictionary may be used to generate a text embedded matrix that provides a vectorized representation of each word in the text object dictionary where similar semantic words have similar vector representations. Using a user entry in the cross-user matrix and the text embedded matrix, the system generates a user-text interest matrix that amplifies each word entry in the text embedded matrix based on the number of text objects associated with that user that use that word in the text embedded matrix. The unsupervised density estimation model for the user associated with the user-text interest matrix is generated based on that user-text interest matrix that identifies relevancy levels for each word in the text object dictionary for the particular user. The unsupervised density estimation model and/or the various matrices and the text object dictionary may update as text objects are added to the text object database and may account for text objects that are deleted from the text object database.

The system may determine a total relevancy score for the text object based on the relevancy of each word in the text object that satisfies the condition and determines whether the first relevancy score satisfies a relevancy condition that may be a predetermined value established by an administrator. If the text object is relevant, the text object may be stored in the text object database, continue to be stored in the text object database, and/or any other relevancy action may be performed. However, if the text object is irrelevant based on its total relevancy score, an irrelevancy action such as deleting the text object, moving the text object, compressing the text object, and/or any other storage saving action may be performed. As such, the systems and methods of the present disclosure may manage storage in a text object database using relevancy of text objects in the database based on the text content of those text objects, resulting in less storage requirements for computer systems.

FIG. 1 illustrates a networked system 100 according to one embodiment of the disclosure. The networked system 100 includes at least one client computing device 110 and a server computing device 130 that may be communicatively coupled with each other via a network 150. The network 150, in one embodiment, may be implemented as a single network or a combination of multiple networks. For example, in various embodiments, the network 150 may include the Internet and/or one or more intranets, landline networks, wireless networks, and/or other appropriate types of communication networks. In another example, the network 150 may comprise a wireless telecommunications network (e.g., cellular phone network) adapted to communicate with other communication networks, such as the Internet.

The client computing device 110 may include, for example, an external network resource that may be utilized by a user to interact with the server computing device 120 that may include an internal network resource over the network 150. For example, the user may use the client computing device 110 to conduct an online purchase transaction with the server computing device 130 via a website hosted by the server computing device 130, a mobile application associated with the server computing device 130, a point-of-sale (POS) system associated with the server computing device 130, an electronic mail communication system associated with the server computing device 130, and/or any other service that may provide data objects that include text content (e.g., content that includes character strings, words, and/or other alphanumeric phrases). The client computing device 110, in various embodiments, may be implemented using any appropriate combination of hardware and/or software configured for wired and/or wireless communication over the network 150. In various implementations, the client computing device 110 may include at least one of a wireless cellular phone, wearable computing device, PC, laptop, etc.

The client computing device 110, in one embodiment, includes an application 112 such as, for example, an external application (e.g., a client application such as, for example, a web browser, a mobile payment application, an electronic mail application, etc.), which may be utilized by the user to conduct electronic transactions (e.g., online payment transactions, etc.) with the server computing device 130 over the network 150, send or receive emails via the server computing device 130, or any other client/server interaction that would be apparent to one of skill in the art in possession of the present disclosure. The client computing device 110 may also include at least one computing device identifier, which may be implemented, for example, as an IP address, operating system registry entries, cookies associated with the application 112, identifiers associated with hardware of the client computing device 110 (e.g., a media control access (MAC) address), network domain information, and/or various other appropriate identifiers. Even though only one client computing device 110 is shown in FIG. 1, it is contemplated that one or more external network resources (each similar to the client computing device 110) may be communicatively coupled with the server computing device 120 via the network 150 within the networked system 100.

The server computing device 130, in various embodiments, may be maintained by an operating entity (or in some cases, by a partner of an operating entity that processes transactions on behalf of the operating entity). Examples of operating entities include but are not limited to merchant sites, resource information sites, utility sites, real estate management sites, social networking sites, email or messaging sites, etc., which offer various services accessible over the network 150. Even though only one server computing device 130 is shown in FIG. 1, it has been contemplated that one or more internal network resources (each similar to the server computing device 130) may be accessible to one or more external network resources that are provided by the client computing device 110 via the network 150 within the networked system 100.

The server computing device 130, in one embodiment, may include a text object application 132, which may be configured to provide data objects that include text content over the network 150 to the application 112 of the client computing device 110. For example, the user of the client computing device 110 may interact with the text object application 132 through the application 112 over the network 150 to request information, conduct a commercial transaction, send or receive email communications, store and/or retrieve data objects, or otherwise interact with the text object application 132. The server computing device 130, in one embodiment, may include at least one computing device identifier, which may identify the server computing device 130 and/or the text object application 132 being accessed by the application 112. In one implementation, the computing device identifier may include a server identifier (e.g. hostname, IP address), application identifier (e.g., URL, application name), and/or other identifier that identifies a server computing device 130 that would be apparent to one of skill in the art in possession of the present disclosure. The computing device identifier may include attributes related to the server computing device 130, such as identification information (e.g., a serial number, a location address, GPS coordinates, a network identification number, etc.).

The server computing device 130, in one embodiment, may be configured to access and/or maintain data needed by the text object application 132 in a text object database 136. For example, the text object database 136 may include historical data objects generated via the text object application 132. In a specific example, the data objects that include textual content and that are stored in the text object database 136 may include email communications associated with various users of an electronic mail service provided by the text object application 132. However, other text object databases 136 (e.g., databases with documents and files that include text content) besides electronic mail databases may be contemplated. While the text object database 136 is illustrated as a single database provided in the server computing device 130, one of skill in the art in possession of the present disclosure will recognize that the text object database 136 may include a plurality of databases, and/or may be directly coupled to the server computing device 130 and/or coupled to the server computing device 130 via the network 150.

The server computing device 130, in various embodiments, may include a text object management application 134, which may be configured to manage data objects stored in the text object database 136, as discussed in further detail below. For example, the text object management application 134 may process data objects gathered from the text object database 136 to determine whether those data objects are irrelevant or relevant to a user associated with a set of the data objects such that the text object management application 134 may perform one or more actions on those data objects depending on the relevancy of the data objects. Furthermore, the text object management application 134 may be implemented as executable computer instructions stored on a computer-readable medium.

In various embodiments, the text object management application 134 may be configured to access and/or maintain data needed by the text object management application 134 in a text object management database 138. For example, the text object management database 138 may include various text object dictionaries, matrices, and/or density estimation models used by the text object management application 134 in determining the relevancy of text objects in the text object database 136, as discussed in more detail below. While the text object management database 138 is illustrated as a single database provided in the server computing device 130, one of skill in the art in possession of the present disclosure will recognize that the text object management database 138 may include a plurality of databases, and/or may be directly coupled to the server computing device 130 and/or coupled to the server computing device 130 via the network 150. Furthermore, while the text object management application 134 and the text object application 132 are illustrated as being provided by the server computing device 130, one of skill in the art in possession of the present disclosure will recognize that separate server computing devices that are coupled to each other via the network 150 may provide the text object management application 134 and/or the text object application 132. While a specific networked system 100 has been illustrated and described, one of skill in the art in possession of the present disclosure will recognize that the networked system 100 of the present disclosure may include a variety of components and component configurations while remaining within the scope of the present disclosure as well.

Figure 2:
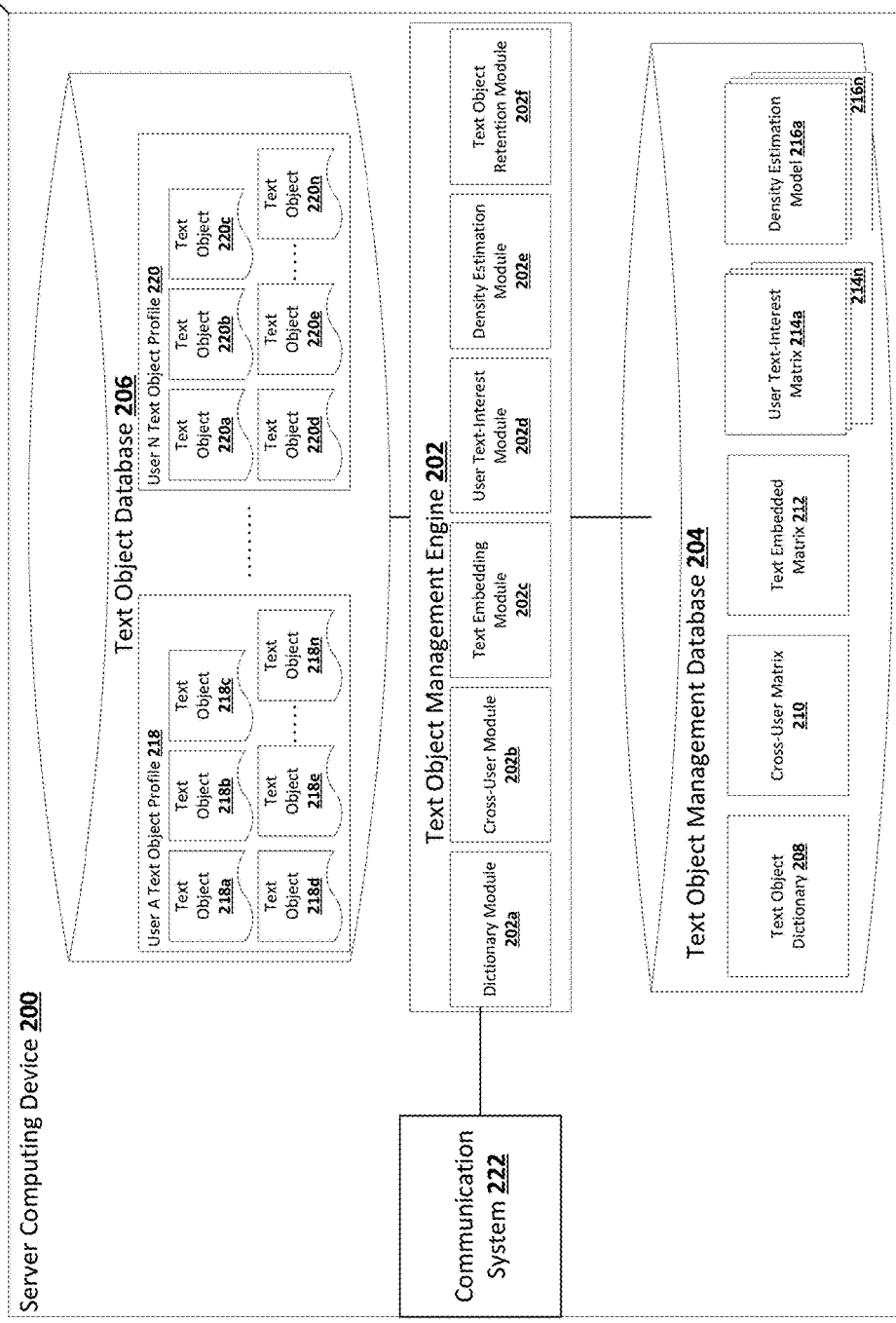
FIG. 2 is a block diagram illustrating a server computing device of the networked system of FIG. 1 according to an embodiment of the present disclosure.

Referring now to FIG. 2, an embodiment of a server computing device 200 is illustrated. In an embodiment, the server computing device 200 may be the server computing device 130 discussed above. In the illustrated embodiment, the server computing device 200 includes a chassis 201 that houses the components of the server computing device 200, only some of which are illustrated in FIG. 2. For example, the chassis 201 may house a processing system (not illustrated) and a non-transitory memory system (not illustrated) that includes instructions that, when executed by the processing system, cause the processing system to provide a text object management engine 202 that is configured to perform the functions of the text object management engines and/or the server computing devices discussed below. Furthermore, the chassis 201 may also house a storage device (not illustrated) that is coupled to the text object management engine 202 (e.g., via a coupling between the storage device and the processing system). The text management engine 202 may include a text object management database 204 that is configured to store the rules and/or other data utilized by the text object management engine 202 in order to provide the functionality discussed below. For example, the text object management database 204 may include a text object dictionary 208, a cross-user matrix 210, a text embedded matrix 212, one or more user text-interest matrices 214a-214n, and one or more density estimation models 216a-216n, discussed in further detail below. Further yet, the storage device or a separate storage device that is coupled to the text object management engine 202 may include a text object database 206 that stores data objects associated with a user of the text object application 132 of FIG. 1. For example, a user text object profile 218 may include text objects 218a, 218b, 218c, 218d, 218e, and/or up to 218n. Similarly, an nth user's user text object profile 220 may include text objects 220a, 220b, 220c, 220d, 220e, and/or up to 220n

In various embodiments, the text object management engine 202 may be software or instructions stored on a computer-readable medium and may include a plurality of modules. For example, the text object management engine 202 may include a dictionary module 202a that is configured to perform the functions of the dictionary modules and the server computing devices discussed below such as, for example, generating and managing the text object dictionary 208. In another example, the text object management engine 202 may include a cross-user module 202b that is configured to perform the functions of the cross-user modules and the server computing devices discussed below such as, for example, generating and managing the cross-user matrix 210. In another example, the text object management engine 202 may include a text embedding module 202c that is configured to perform the functions of the text embedding modules and the server computing devices discussed below such as, for example, generating and managing the text embedded matrix 212. In another example, the text object management engine 202 may include a user text-interest module 202d that is configured to perform the functions of user text-interest modules and the server computing devices discussed below such as, for example, generating and managing the user text-interest matrices 214a-214n. In another example, the text object management engine 202 may include a density estimation module 202e that is configured to perform the functions of the density estimation modules and the server computing devices discussed below such as, for example, generating and managing the density estimation models 216a-216n. In yet another example, the text object management engine 202 may include a text object retention module 202f that is configured to perform the functions of the text object retention modules and the server computing devices discussed below such as, for example, determining a relevancy of text objects 218a-218n and/or 220a-220n in the text object database 206 and performing various actions (e.g., deleting, retaining, archiving, etc.) text objects based on their relevancy using the density estimation models 216a-216n.

The chassis 201 also houses the communication system 222 that is coupled to the text object management engine 202 (e.g., via a coupling between the communication system 314 and the processing system), and that may include a network interface controller (NIC), programmable Smart NIC, a wireless communication subsystem, and/or other communication subsystems known in the art. While the text object management database 204 and the text object database 206 are illustrated as stored in the one or more storage devices that are housed in the chassis 201, one of skill in the art in possession of the present disclosure will recognize that the text object management database 204 and/or the text object database 206 may be stored in a storage device that is located outside the chassis 201 and that is accessible to the text object management engine 202 through a network (e.g., the network 150 of FIG. 1) via the communication system 222. As will be appreciated by one of skill in the art in possession of the present disclosure, the storage device and communication system 222 may enable the text object management engine 202 to access the text object management database 204 and/or the text object database 206 without having to store the text object management database 204 and/or the text object database 206 directly on the server computing device 200. However, while specific components of the server computing device 200 have been illustrated and described, one of skill in the art in possession of the present disclosure will recognize that other components may be included in the chassis 201 and utilized to perform the functionality described below, as well as conventional server computing device functionality (e.g., a providing the text object application 132 of FIG. 1), while remaining within the scope of the present disclosure.

Figure 3:
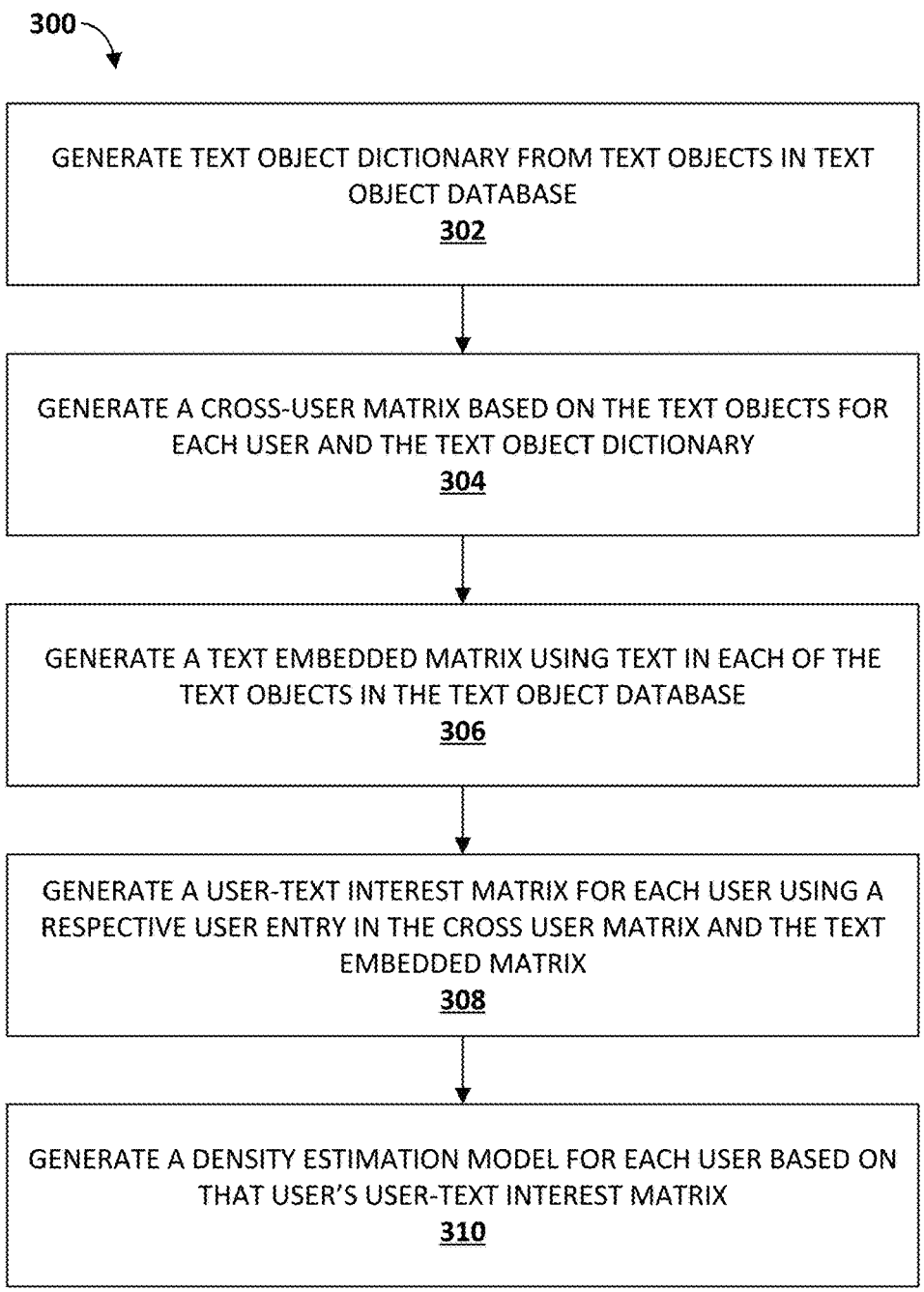
FIG. 3 is a flowchart illustrating a method of generating a density estimation model according to an embodiment of the present disclosure.

FIG. 3 illustrates a method 300 for generating a density estimation model (e.g., density estimation models 216a-216n) according to an embodiment of the present disclosure. In various embodiments, the server computing device 130 may execute some or all of the elements of method 300. However, it is contemplated that the client computing device 110 may execute some or all of the elements of the method 300, according to various embodiments. The density estimation models 216a-216n may be generated using a plurality of data objects (e.g., the text objects 218a-220n) that each include text content and that are associated with a plurality of users of a service (e.g., the text object application 132 of FIG. 1) associated with the data objects, and using a set of the plurality of data objects (e.g., the text objects 218a-218n associated with the user of the user text object profile 218) that are associated with the a respective user of the density estimation models 216a-216n.

For example, the method 300 begins at block 302 where a text object dictionary is generated from text objects in a text object database. In an embodiment, at block 302 and with reference to FIG. 2, the dictionary module 202a provided by the text object management engine 202 included in the server computing device 200 may generate the text object dictionary 208. Initially, the dictionary module 202a may generate the text object dictionary 208 from the text objects 218a-218n and 220a-220n. The dictionary module 202a may count a number of occurrences for each unique word in the text content of the all of the text objects 218a-220n or a statistically representative number of the text objects 218a-220n in the text object database 206. The dictionary module 202a may map the number of occurrences of each word in the text content of the text objects 218a-220n to each word to generate the dictionary module 202a. The dictionary module 202a may add new words that do not exist in the text object dictionary 208 or increase a count of an existing word in the dictionary module when new text objects are stored in the text object database 206. In some embodiments, the count of a word may be decreased in response to a text object in the text object database 206 being deleted that includes that word. However, in some instances the count for a word may not decrease in the text object dictionary 208 when a text object is deleted from the text object database 206 to account for words that may be irrelevant.

Referring to FIG. 4, an example text object dictionary 400 is illustrated. The text object dictionary 400 may include a word column 402a and a number of occurrences column 402b. The text object dictionary 400 may include a row (e.g., rows 404a, 404b, 404c, 404d, 404e, 404f, 404g, 404h, 404i and up to 404n) for each unique word in the text objects 218a-220n. For example, the row 404a may include "Tomer" as an entry in the word column 402a, which has been used in the text objects 218a-220n "12" times as indicated in the number of occurrences column 402b. The row 404b may include "greetings" as an entry in the word column 402a, which has been used in the text objects 218a-220n "2,981" times as indicted in the number of occurrences column 402b. The row 404c may include "is" as an entry in the word column 402a, which has been used in the text objects 218a-220n "2,000" times as indicted in the number of occurrences column 402b. The row 404d may include "algorithm" as an entry in the word column 402a, which has been used in the text objects 218a-220n "5,000" times as indicted in the number of occurrences column 402b. The row 404e may include "deep" as an entry in the word column 402a, which has been used in the text objects 218a-220n "240" times as indicted in the number of occurrences column 402b. The row 404f may include "learning" as an entry in the word column 402a, which has been used in the text objects 218a-220n "100" times as indicted in the number of occurrences column 402b. The row 404g may include "ProjectX" as an entry in the word column 402a, which has been used in the text objects 218a-220n "15" times as indicted in the number of occurrences column 402b. The row 404h may include "Itay" as an entry in the word column 402a, which has been used in the text objects 218a-220n "30" times as indicted in the number of occurrences column 402b. The row 404i may include "my" as an entry in the word column 402a, which has been used in the text objects 218a-220n "40,000" times as indicted in the number of occurrences column 402b. The row 404j may include "name" as an entry in the word column 402a, which has been used in the text objects 218a-220n "15,550" times as indicted in the number of occurrences column 402b. The text object dictionary 400 may continue until the row 404n where the nth word is stored as an entry the word column 402a and the number of occurrences for that word is indicated in the number of occurrences column 402b.

Referring back to FIG. 3, the method 300 then proceeds to block 304 where a cross-user matrix is generated based on the text objects associated with a user and the text object dictionary. In an embodiment, at block 304, the cross-user module 202b provided by the text object management engine 202 included in the server computing device 200 may generate the cross-user matrix 210. The cross-user matrix 210 may include the number of text objects associated with a user (e.g., text objects sent and/or received via an electronic mail application (e.g., text object application 132)) that include words in the text object dictionary 208 of FIG. 2. For example, if a first user sent out 60 emails and 30 of those emails include at least one instance of the word "algorithm," the cross-user matrix 210 would have an entry for that first user and the word "algorithm" of 30. A second user may have sent out 72 emails and 37 of those emails include at least one instance of the word "algorithm." As such, the cross-user matrix 210 would have an entry for that second user and the word "algorithm" of 37. In some embodiments where the text object application 132 is an electronic mail or other messaging application, the text objects associated with the user used to generate the cross-user matrix 210 may only include sent data objects as the sent data objects may be more indicative of text content that is important to the user.

Referring now to FIG. 5, an example cross-user matrix 500 is illustrated. In the illustrated embodiment, the cross-user matrix 500 may include a column (e.g., columns 502a, 502b, 502c, 502d, 502e, 502f, 502g, 502h, 502i, 502j, and up to 502n) for each word of the text object dictionary 208. For example, "Tomer" is column 502a, "greetings" is column 502b, "is" is column 502c, "algorithm" is column 502d, "deep" is column 502e, "learning" is column 502f, "ProjectX" is column 502g, "Itay" is column 502h, "my" is column 502i, and "name" is column 502j, and so on. Each row (e.g., rows 504a, 504b, and up to 504n) of the cross-user matrix 500 may represent a user of the text object application 132 of FIG. 1. For example, "first user" may be associated with the row 504a, "second user" may be associated with the row 504b, and "nth user" may be associated with the row 504n. A user identifier such as a name, an employee ID, telephone number, email address, and/or any other user identifier that would be apparent to one of skill in the art in possession of the present disclosure may be provided to identify the users.

In an example, the "first user" of row 504a may be associated with the user text object profile 218 that includes the text objects 218a-218n. The text object 218a may include the text content {"greeting, my name is Tomer, ProjectX uses algorithm"}. The text object 218b may include the text content {"Tomer, algorithm deep learning is an algorithm"}. The text object 218c may include the text content {"ProjectX, Deep learning. Deep learning ProjectX"}. The text object 218d may include the text content {"ProjectX, Deep learning, algorithm is ProjectX"}. The text object 218e may include the text content {"ProjectX, is a deep learning algorithm"}. As such, for each word in columns 502a-502n, the number of text objects that include at least one instance of that word and that are associated with the first user is entered. For example, "Tomer" is used in text objects 218a and 218b. Therefore, a value of "2" is inserted in column 502a for row 504a. In another example, "ProjectX" is used in text objects 218a, 218c, 218d, and 218e. Therefore, a value of "4" is inserted in column 502b for row 504a. In another example, the word "Itay" is not used in any of the text objects 218a-218n, and thus a value of "0" is inserted in column 502h for row 504a. In another example, the "second user" of row 504b may be associated with the user text object profile 220 that includes the text objects 220a-220n. Values for the number of the text objects 220a-220n that include the words of the text object dictionary 208 may be inserted by the cross-user module 202b in columns 502a-502n for the second user in the row 504b.

Referring back to FIG. 3, the method 300 may then proceed to block 306 where a text embedded matrix is generated using text content in each of the text objects in the text object database. In an embodiment at block 306, the text embedding module 202c provided by the text object management engine 202 included in the server computing device 200 may generate a text embedded matrix 212 using the text content in each of the text objects 218a-220n in the text object database 206. For example, the text embedding module 202c may embed each word in the text object dictionary 208 as a fixed length vector where words with high semantic similarity may be embedded to similar vectors (e.g., with high cosine similarity). The text embedded matrix 212 may have a size of M×d where M is the number of unique words across the text objects 218a-220n and d is the dimension of the fixed length vector. Too large of value of d may provide sparse feature space. That space may lead to overfitting, improper training of a Gaussian Mixture model, and difficulty in mapping semantic similar words in the same space. Too small value of d indicates a low number of dimensions without the ability to grasp the semantic differences between different words. In various embodiments, the text embedding module 212 may include a word2vec algorithm or any other text embedding algorithm that would be apparent to one skill in the art in possession of the present disclosure.

Referring to FIG. 6, an example text embedded matrix 600 that may be the text embedded matrix of 212 of FIG. 2 is illustrated. In an embodiment, the text embedded matrix 600 may have a d value of 2 such that there are two dimensions (e.g., column 602a and column 602b) of vector representation. The rows (e.g., rows 604a, 604b, 604c, 604d, 604e, 604f, 604g, 604h, 604i, 604j, and up to 604n) may include each word in the text object dictionary 208 mapped to one fixed length vector. As illustrated in FIG. 6, the word "algorithm" as entered in row 604d has a fixed vector length of (0.2, 0.1) and the word "learning" as entered in row 604f has a fixed vector length of (0.2, 0.13). As such, "algorithm" and "learning" are quite similar because "algorithm" and "learning" have similar semantic meaning in the context of data science. In contrast, the word "Itay" as entered in row 604h having a fixed length vector length of (6, 6.2) and the word "is" as entered in row 604c having a fixed length vector length of (−3.5,−3.5) are dissimilar in semantic meaning with each other or the words "algorithm" and "learning" due to their differences in fixed vector lengths.

Referring back to FIG. 3, the method 300 may then proceed to block 308 where a user-text interest matrix is generated for each user. In an embodiment, at block 308, the user text-interest module 202d provided by the text object management engine 202 included in the server computing device 200 may generate a user text-interest matrix 214a-214n for each user of the text object application 132 using a respective user entry in the cross-user matrix 210 and the text embedded matrix 212. For example, each user will be associated with a respective user text-interest matrix 214a-214n of size 0×d where d is the fixed length vector of the text embedded matrix 212. When generating the rows of each user text-interest matrix 214a-214n, the user text-interest module 202d obtains the values presented in each row of the cross-user matrix 210 for that user associated with the row and appends a new row to that user's user text-interest matrix t times for each word, where t=round(ln(1+cell), and where cell is the value for each word found in the row associated with the user in the cross-user matrix 210. While a specific equation is used to represent the frequency of the use of a particular word by a user, one of skill in the art in possession of the present disclosure will recognize that other equations may be used to represent the frequency of use of a particular word by a user.

Referring to FIG. 7, an example user text-interest matrix 700 associated with the first user in row 504a in the cross-user matrix 500 of FIG. 5 is illustrated. The user text-interest matrix 700 may include a column 702a and a column 702b. The columns 702a and 702b are determined based on the dimensions of the text embedded matrix 600 of FIG. 6, which is d=2. To generate the rows of the user text-interest matrix 700, the user text-interest module 202d may obtain the values for each word in the row 504a for the first user in the cross-user matrix and determine t using the equation t=round(ln(1+cell). For example, for the word "Tomer", t=round(ln(1+2))=1, where 2 is the number of text objects that included the word "Tomer." For the word "greeting", t=round(ln(1+1))=1. For the word "is", t=round (ln(1+4))=2. For the word "algorithm", t=round(ln(1+4))=2. For the word "deep", t=round(ln(1+4))=2. For the word "learning", t=round(ln(1+4))=2. For the word "ProjectX", t=round(ln(1+4))=2. For the word "Itay", t=round(ln(1+0)) =0. For the word "my", t=round(ln(1+1))=1. For the word "name", t=round(ln(1+1))=1. As such, the user text-interest matrix 700 includes one row entry for "Tomer" (e.g., row 704a), one row entry for "greeting" (e.g., row 704b), two row entries for "is" (e.g., row 704c and row 704d), two row entries for "algorithm" (e.g., row 704e and row 704f), two row entries for "deep" (e.g., row 704g and row 704h), two row entries for "learning" (e.g., row 704i and row 704j), two row entries for "ProjectX" (e.g., row 704k and row 704l), zero row entries for "Itay", one row entry for "my" (e.g., row 704m), and one row entry for "name" (e.g., row 704o).

The method 300 then proceeds to block 310 where a density estimation model is generated for each user. In an embodiment, at block 310, the density estimation module 202e provided by the text object management engine 202 included in the server computing device 200 generates a density estimation model 216a-216n for each user based on each user's user text-interest matrix 214a-214n. For example, the density estimation module 202e may train the density estimation models 216a-216n, which may be multidimensional (e.g., based in d), density estimation, unsupervised machine learning models (e.g., a Gaussian Mixture model with an arbitrary number of gaussians (G)). The G may be used to estimate the density function of the density estimation models 216a-216n. G may be predetermined and may be assigned the same across all users or have different values for each user based on user factors (e.g., rank, diversity of projects, etc.). The higher the value of G, the more non-continuous areas of high probabilities will be generated on each density estimation model 216a-216.

Figure 8:
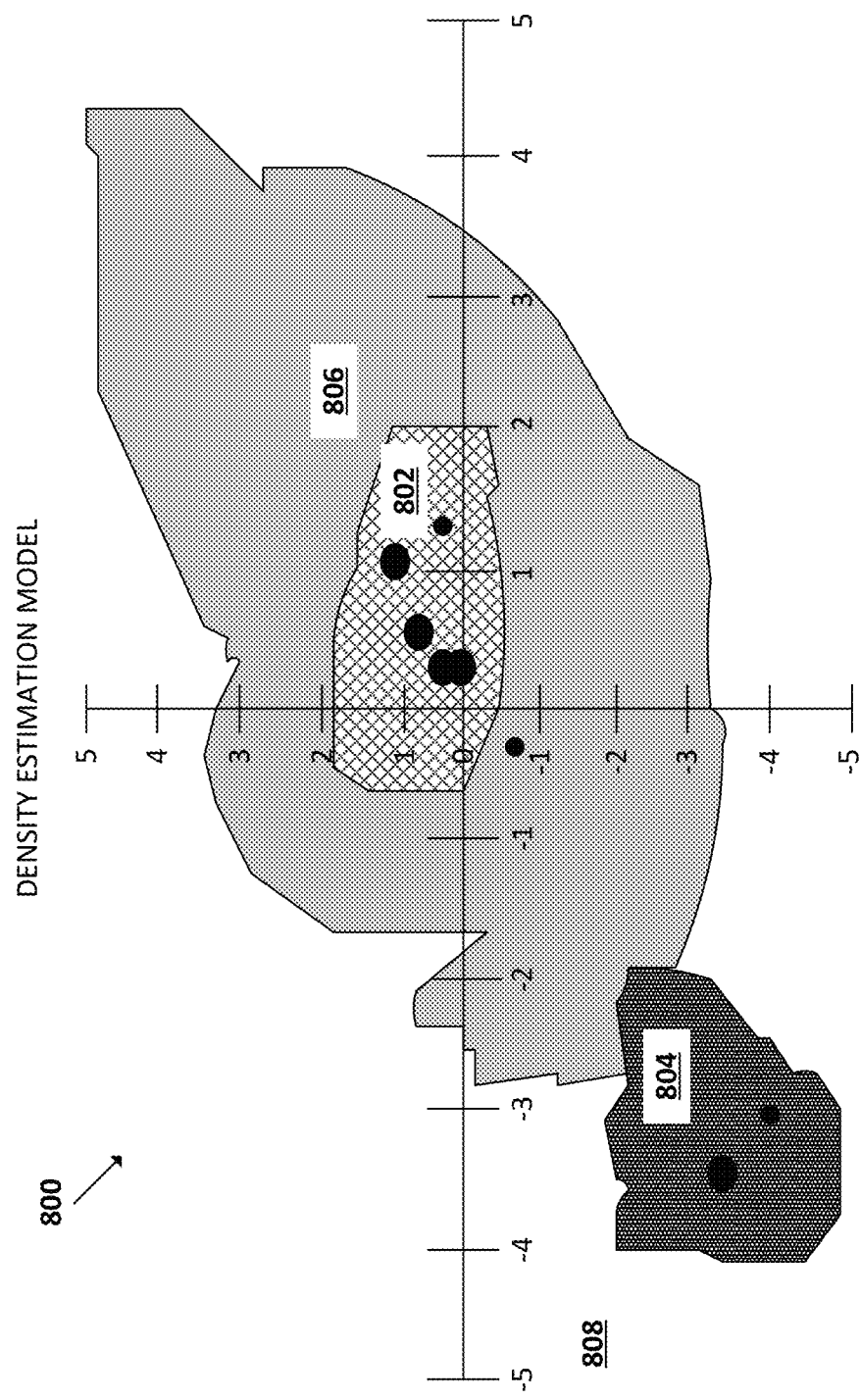
FIG. 8 is a graph illustrating a density estimation model generated during the method of FIG. 3 according to an embodiment of the present disclosure.

Referring now to FIG. 8, a density estimation model 800 is illustrated for the first user of row 504a of the cross-user matrix 500, which is generated based on the user text-interest matrix 700. For example, each row in the user text-interest matrix 700 may be plotted to the density estimation model 800. Based on the value of G, the density estimation module 202e may generate various areas 802, 804, 806, and 808 of high probabilities. The areas with the highest concentration (e.g., area 802) may include words of high interest to the first user because the first user uses these words frequently, which may indicate that text objects that include these words are more likely to be relevant to the first user. The area 802 may be associated with a first score. The area 804 may have the next highest score (e.g., a second score that is lower than the first score) as there is a relatively high concentration of words used by the user that have vector representations falling within the area 804. The area 806 may have a score lower than the score for area 804 (e.g., a third score lower than the second score) as a few words used by the first user have vector representations falling within the area 806. The area 808 may be associated with the lowest score (e.g., a fourth score lower than the third score) because relatively very few words used by the first user have vector representations falling within the area 808. While method 300 illustrates and example method of generating a density estimation model, one skill in the art in possession of the present disclosure will recognize that other steps and algorithms may be used to generate a density estimation model that is used to manage data objects of the present disclosure.

Figure 9:
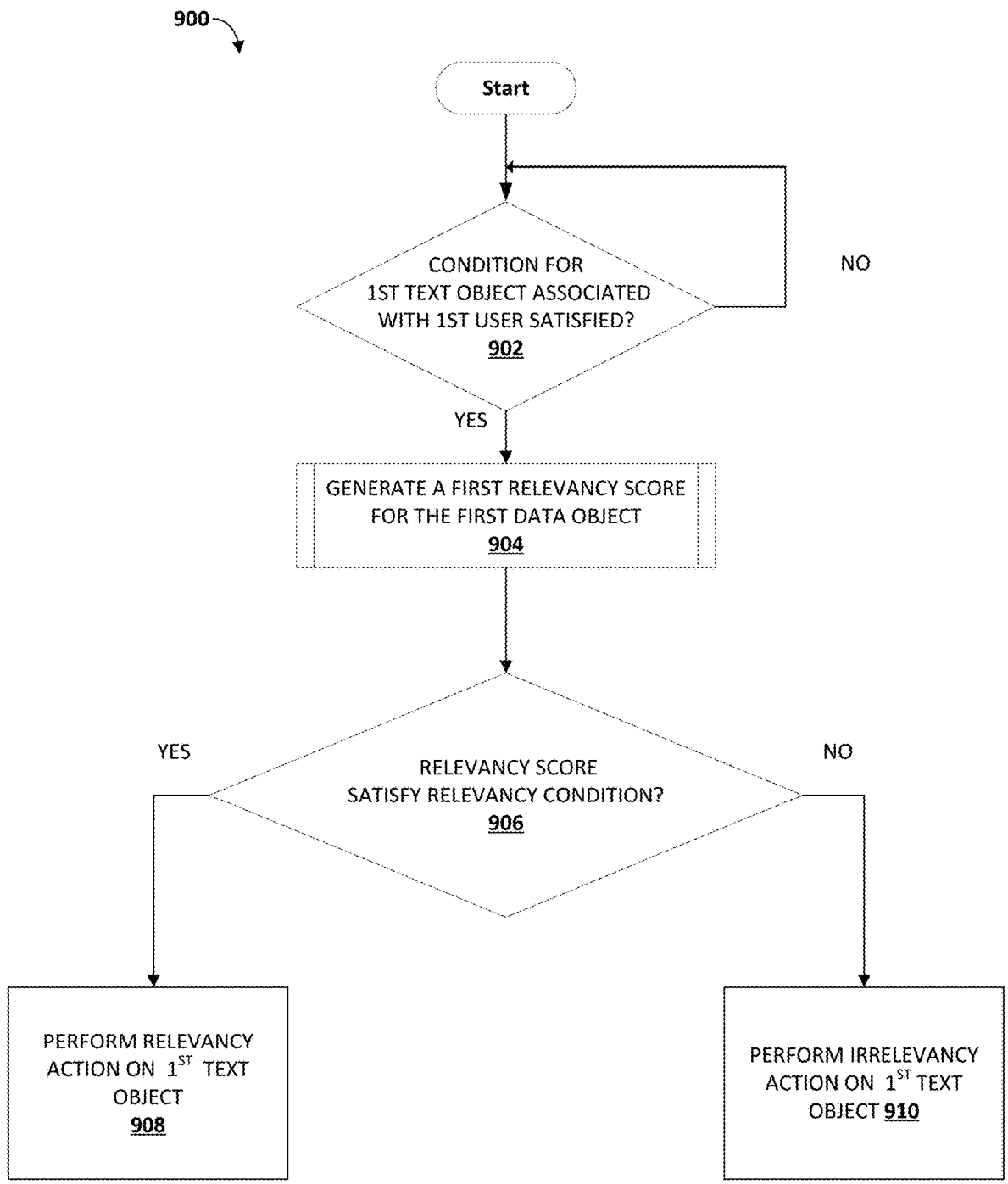
FIG. 9 is a flowchart illustrating a method of managing text objects according to an embodiment of the present disclosure FIG. 10 a flowchart illustrating a sub-method of generating a relevancy score for a data object performed during the method of managing text objects of FIG. 9 according to an embodiment of the present disclosure.

Referring now to FIG. 9, a method 900 for managing data objects that include text content is illustrated according to an embodiment of the present disclosure. In various embodiments, the server computing device 130 may execute some or all of the elements of the method 900. However, it is contemplated that the client computing device 110 may execute some or all of the elements of the method 300 according to various embodiments. The method 900 begins at decision block 902 where it is determined whether a management condition for a first data object that includes text content (e.g., a text object) has been satisfied. In an embodiment, at decision block 902, the text object retention module 202f provided by the text object management engine 202 included in the server computing device 200 monitors the text objects 218a-218n and/or 220a-220n to determine whether the text objects 218a-218n and/or 220a-220n satisfy any predetermined management conditions to determine whether the text object retention module 202f should perform any text object management actions on the text objects 218-218n and/or 220a-220n. For example, the management condition may include a predetermined time period that may have lapsed after a text object was first stored in the text object database 206. In another example, the management condition may include a predetermined time period that may have lapsed after the user associated with the user text object profile 218 and/or the user text object profile 220 first accessed the text object. In yet another example, the management condition may include a predetermined time period that may have lapsed after the user associated with the user text object profile 218 and/or the user text object profile 220 last accessed the text object. In yet other examples, the predetermined management condition may be user specific, may include a storage capacity threshold of the text object database 206, a storage capacity threshold of the user text object profile 218 and/or 220, may include a time period (e.g., once per month, once per quarter, once per year, etc.), and/or any other management condition or combination of management conditions that would be apparent to one of skill in the art in possession of the present disclosure. If at decision block 902 the data object does not satisfy a management condition, the text object retention module 202f may continue to monitor each of the text objects 218a-220n until one of the text objects 218a-220n and/or any of the components of the networked system 100 satisfy the management condition.

Alternatively, if at decision block 902 the management condition is satisfied, the method 900 may then proceed to block 904 where a first relevancy score is generated for each data object that satisfies the management condition. In an embodiment, at block 904, the text object retention module 202f may generate a relevancy score for one or more of the text objects 218a-220n that satisfy the management condition. For example, the text object retention module 202f may generate the relevancy score for the text object 218a by using the density estimation model 216a/800 that is associated with the first user of the user text object profile 218 and using the text content of the text object 218a.

Figure 10:
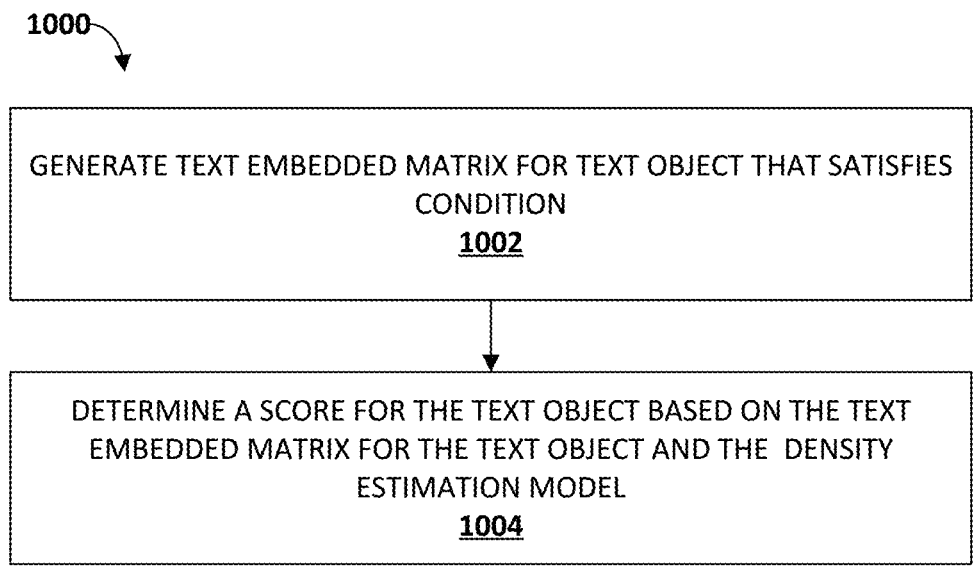

Referring to FIG. 10, a sub-method 1000 of block 904 is illustrated. The sub-method 1000 begins at block 1002 where a text embedded matrix is generated for the text object that satisfies the management condition. In an embodiment, at block 1002, the text embedding module 202c may generate a text embedded matrix for the text object 218n similarly to the generation of the text embedded matrix 212, discussed above. For example, the text object 218n text object (for the user of the user text object profile 218 may include the text content {"My name is Itay, Itay is algorithm"}. FIG. 11 illustrates a text embedded matrix 1100 for the text object 218n. The number of columns (e.g., the columns 1102a and 1102b) may represent the number of dimensions of the matrix (e.g., d=2) and provide value entries for each dimension and the rows 1104a-1104e may be each unique word in the text content of the text object 218n. For example, in row 1104a "my" may be associated with the vector representation (−3, −4). In row 1104b, "name" may be associated with the vector representation (−6, −6). In row 1104c, "is" may be associated with the vector representation (−3.5, −3.5). In row 1104d, "Itay" may be associated with the vector representation (6, 6.2). In row 1104e, "algorithm" may be associated with the vector representation (0.2, 0.1).

The sub-method 1000 may then proceed to block 1004 where a relevancy score is generated for the text object based on the text embedded matrix for the text object and the density estimation model for the user associated with the text object. In an embodiment, at block 1004, the text object retention module 202f may generate a relevancy score for the text object 218n. For example, the text object retention module 202f may determine, based on the vector representations of each word in the text embedded matrix for the text object, where in the density estimation model 216a each word is located. For each location that the vector representation is located in the density estimation model 216a, the text object retention module 202f may assign the score for that location to the word. For example, "algorithm" may have a first score because the vector representation (0.2,0.1) is found in area 802 of the density estimation model 216a/800. The words "is" and "my" may have a second score that is less than the first score because the vector representations (−3.5, −3.5) and (−3, −4), respectively, are found in the area 804 of the density estimation model 216a/800. The words "name" and "Itay" may have the fourth score that is less than the second score because the vector representations (−6, −6) and (6, 6.2), respectively, are found in the area 808 of the density estimation model 216a/800.

In an embodiment, the text object retention module 202f uses the scores of each of the words in the text object 218n to determine a relevancy score. The text object retention module 202f may use an equation that prevents words that are both commonly used by the first user and other users associated with the text objects in the text object database 206 to be highly weighted. Similarly, the equation may account for words that are not used by the first user very often and have a low score based on their location in the density estimation model 216a/800 but are highly relevant because they may not be used by the rest of the users of the associated with the text objects in the text object database 206. The equation may be relevancy score=$1/n\Sigma_{i=1}^{n}$ score(i)/ln(1+occurrence(i)), where n is the number of words in the text object, score(i) is score for each word in the text object based on the density estimation model 216a/800, and occurrence(i) is the number of occurrence of the word in all of the text objects in the text object database 206 (e.g., the values found in the text object dictionary 400). Continuing with the example for text object 218a, the relevancy score is represented by the equation:

$$\text{Score} = \frac{1}{7}\left(\frac{\text{score(my)}}{\ln(40001)} + \frac{\text{score(Name)}}{\ln(15501)} + \frac{2*\text{score(is)}}{\ln(2001)} + \frac{2*\text{score}(Itay)}{\ln(31)} + \frac{\text{score(Algorithm)}}{\ln(5001)}\right)$$

As can be seen from the relevancy score equation for the text object 218a, the relevancy score may be relatively low as the score for all of the words (except "algorithm") should be quite low because most of the words do not align with the high relevancy area (e.g., area 802 in the density estimation model 800 of FIG. 8). While "Itay" is a highly weighted word because "Itay" is not included in much text content of the text objects 218a-220n in the text object database 206, "Itay" is found in a low score area (e.g., area 808) of the density estimation model 800 for the first user. While the text object 218n may have a relevancy score that is relatively low, the text object 218n may have a relevancy score that is relatively high when the text object 218n is associated with another user. For example, the text object 220a may include the same or substantially similar text content as text object 218n. The density estimation model 216n associated with the user of the user text object profile 220 may have a higher score for "Itay" as that user may use that word more frequently than the user of the user text object profile 218.

Referring back to FIG. 9, the method 900 may proceed to decision block 906 where it is determined whether the relevancy score satisfies a relevancy condition. In an embodiment, at decision block 906, the text object retention module 202f may compare the relevancy score determined for the text object 218n to a relevancy condition such as a predetermined value. The predetermined value may be unique for each user or a global predetermined value for all of the users. The value may be set based on the cost of false positive (e.g., how detrimental it would be if a user could not find the text object because the text object was deleted) and/or the cost of a false negative (e.g., how detrimental it would be to keep an irrelevant text object).

If at decision block 906 it is determined that the relevancy score satisfies a relevancy condition, then the method 900 may proceed to block 908 where a relevancy action may be performed. In an embodiment, at block 908, the text object retention module 202f may perform the relevancy action. For example, the relevancy action may include keeping a full version of the text object 218n stored in the text object database 136/206, enabling a protective setting to the text object 218n, archiving the text object 218n for the user, compressing the text object 218n, not deleting the text object 218n, and/or any other action that would be consistent with a relevant text object that would be apparent to one of skill in the art in possession of the present disclosure.

However, if at decision block 906 it is determined that the relevancy score satisfies an irrelevancy condition or not the relevancy condition, the method may proceed to block 910 where an irrelevancy action may be performed. In an embodiment, at block 910, the text object retention module 202f may perform the irrelevancy action. For example, the irrelevancy action may include deleting the text object 218n, archiving the text object 218n for the user, compressing the text object 218n, not keeping a full version of the text object 218n, and/or any other action that would be consistent with an irrelevant text object that would be apparent to one of skill in the art in possession of the present disclosure.

As discussed above, in some situations there may be multiple text objects that include the same or substantially similar text content where each text object is associated with a different user. As such, because each user may have a different density estimation model according to the systems and methods of the present disclosure, it is contemplated that an irrelevancy action may be performed on a first portion of those text objects associated with some users, while a relevancy action may be performed on another portion of those text objects for other users.

Thus, systems and methods have been described where a density estimation model is generated for each user of a text object application based on text objects associated with the user and the text objects across all users of the text object application. The density estimation model may indicate which words are relevant or irrelevant to the user based on how frequently the user uses the words in text objects associated with that user. As such, when a text object associated with a user is associated with a satisfied management condition, a relevancy score for that text object associated with the user may be determined and compared to a relevancy score condition. If the relevancy score of the text object indicates that text object is relevant to the user, a relevancy action may be performed on the text object (e.g., maintain storage of the text object, implementing protections on the text object, etc.). If the relevancy score of the text object indicates that text object is irrelevant to the user, an irrelevancy action may be performed on the text object (e.g., delete the text object, compress the text object, move the text object, etc.). implementing protections on the text object, etc.). As such, the management of text objects, according to the systems and methods of the present disclosure, reduces storage resource consumption by providing a mechanism to perform storage reduction actions on irrelevant text objects while preserving relevant text objects. This provides benefits over conventional text object management systems where either all text objects are deleted and/or compressed after a period of time to optimize storage resources at the expense of losing text objects that may need to be accessed again by a user or maintaining a large database of text objects indefinitely that may never be accessed again.

Figure 12:
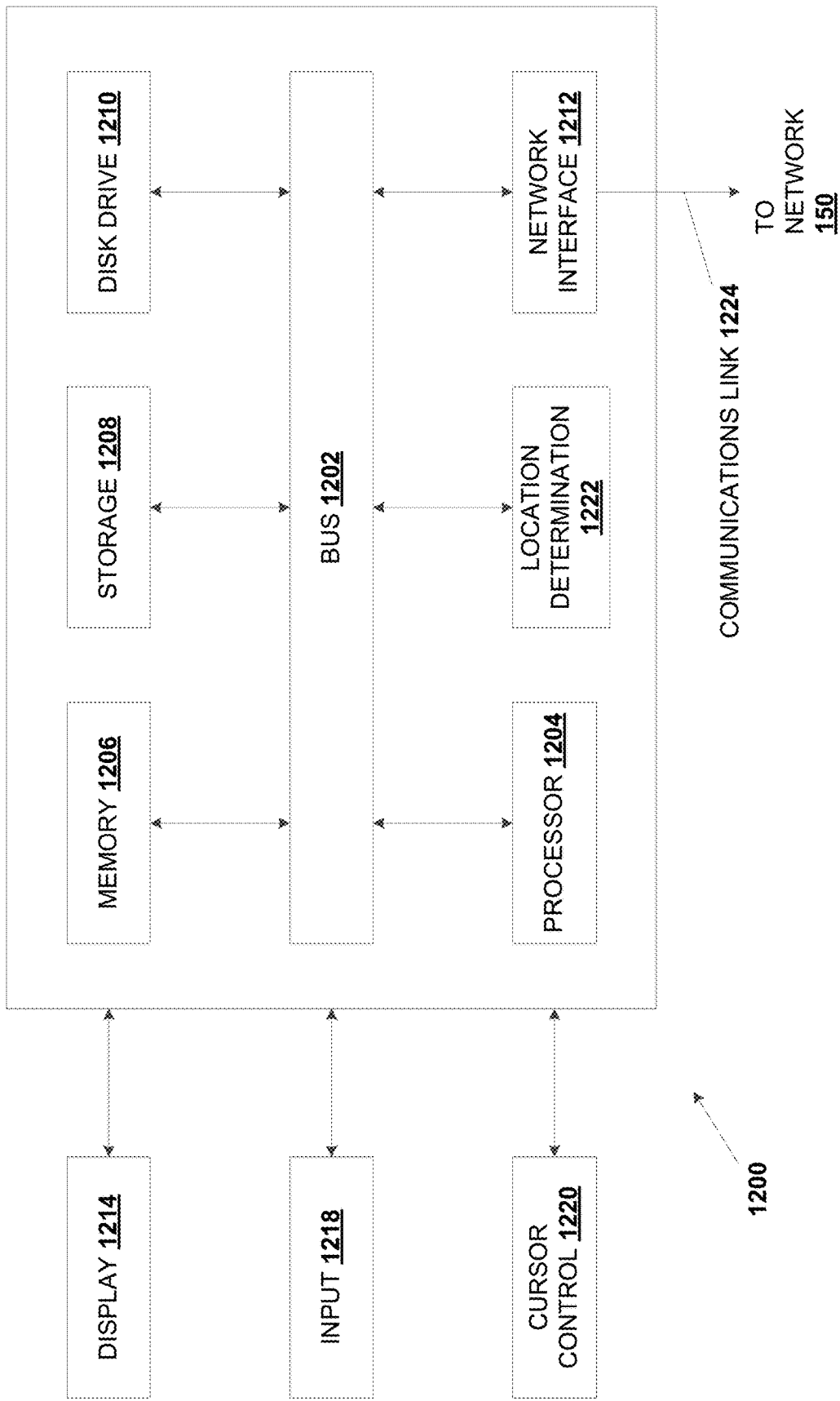
FIG. 12 is a block diagram of an example computer system according to various aspects of the present disclosure.

FIG. 12 is a block diagram of a computer system 1200 suitable for implementing one or more embodiments of the present disclosure, including the server computing device 130 and the client computing device 110. In various implementations, the client computing device 110 may include a mobile cellular phone, personal computer (PC), laptop, wearable computing device, etc. adapted for wireless communication, and the server computing device 130 may include a network computing device, such as a server. Thus, it should be appreciated that the computing devices 110 and 130 may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processor 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and/or a location determination component 1222 (e.g., a Global Positioning System (GPS) device as illustrated, a cell tower triangulation device, and/or a variety of other location determination devices known in the art.) In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the computing devices and anomaly detection server, and/or any other device. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 150 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a computing device, a server device, other devices described herein.

What is claimed is:

1. A system, comprising:
   a non-transitory memory storing instructions; and
   one or more hardware processors coupled to the non-transitory memory and configured to read the instructions from the non-transitory memory to cause the system to perform operations comprising:
      determining that a condition for a data object has been satisfied, wherein the data object includes text content and the data object is associated with a user of a service;
      generating, in response to the condition for the data object being satisfied, a relevancy score for the data object,
         wherein the relevancy score is based on the text content of the data object and a density estimation model associated with the user, and
         wherein the density estimation model was generated by:
            generating a text object dictionary including text sequences for a plurality of users of the service using a plurality of data objects that each include text content and that are associated with the plurality of users; and
            generating a user text-interest matrix that identifies relevancy levels for each text sequence in the text object dictionary for the user, based on the text content of a set of the plurality of data objects associated with the user;
      determining whether the relevancy score satisfies a relevancy condition; and
      performing, in response to the relevancy score satisfying the relevancy condition, a first type action on the data object.

2. The system of claim 1, wherein the performing the first type action on the data object includes storing the data object in a database.

3. The system of claim 1, wherein the operations further comprise:
   performing, in response to the relevancy score satisfying an irrelevancy condition, a second type action on the data object.

4. The system of claim 3, wherein the performing the second type action on the data object includes deleting the data object.

5. The system of claim 1, wherein the condition includes a predetermined time period that the data object has been stored in a database.

6. The system of claim 1, wherein the density estimation model for the user is generated further by:
   embedding, using a text embedding module, each text sequence in the text content of the plurality of data objects into a vector having a predefined dimension such that text sequences with a semantic similarity are embedded with vectors that have values that satisfy a threshold of similarity;
   determining a vector frequency for each vector or group of vectors based on a text frequency of the text sequences in the set of the plurality of data objects associated with the user; and
   generating an interest score for each vector or a group of vectors based on the vector frequency.

7. The system of claim 6, wherein the generating the relevancy score for the data object based on the text content of the data object includes:
   embedding, using the text embedding module, each text sequence in the text content of the data object, into a respective vector having the predefined dimension;
   correlating the respective vector for each text sequence in the text content of the data object to each vector or group of vectors in the density estimation model to determine an interest score for each text sequence in the data object; and
   determining the relevancy score for the data object based on the interest scores for each text sequence in the text content of the data object and a frequency that each text sequence is present in the plurality of data objects associated with the plurality of users.

8. The system of claim 1, wherein the text content is a plurality of words.

9. A method, comprising:
   embedding, by a computing device using a text embedding module, each text sequence of text content of a plurality of data objects into a respective vector,
      wherein that plurality of data objects are associated with a plurality of users of a service that is provided by the computing device, and
      wherein the respective vectors each have a predefined dimension such that text sequences with a semantic similarity are embedded with vectors that satisfy a threshold of similarity;
   determining, by the computing device, a vector frequency for each vector based on a text frequency of text sequences in a first set of the plurality of data objects associated with a first user;
   generating, by the computing device, an interest score for each vector or group of vectors associated with the first set based on the vector frequency for the first set;
   aggregating, by the computing device, the interest scores for the vector or group of vectors into a first density estimation model associated with the first user, wherein the first density estimation model is generated by:
      generating a text object dictionary including text sequences for the plurality of users of the service using the plurality of data objects; and
      generating a user text-interest matrix that identifies relevancy levels for each text sequence in the text object dictionary for the first user, based on the text content of the first set of the plurality of data objects associated with the first user; and prioritizing, by the computing device and using the first density estimation model, each data object of the first set.

10. The method of claim 9, further comprising:
determining, by the computing device, that a condition for a first data object that includes text content and that is associated with the first user has been satisfied;
generating, by the computing device and in response to the condition for the first data object being satisfied, a first relevancy score for the first data object based on the text content of the first data object and the first density estimation model;
determining, by the computing device, that a condition for a second data object that includes text content and that is associated with the first user has been satisfied; and
generating, by the computing device and in response to the condition for the second data object being satisfied, a second relevancy score for the second data object based on the text content of the second data object and the first density estimation model, and wherein the prioritizing each data object of the first set includes prioritizing the first data object in relation to the second data object based on the first relevancy score and the second relevancy score.

11. The method of claim 9, further comprising:
determining, by the computing device, that a condition for a first data object that includes text content and that is associated with the first user has been satisfied;
generating, by the computing device and in response to the condition for the first data object being satisfied, a first relevancy score for the first data object based on the text content of the first data object and the first density estimation model; and
performing, by the computing device and in response to the first relevancy score satisfying a relevancy condition, a first type of action on the first data object.

12. The method of claim 11, wherein the generating the first relevancy score for the first data object based on the text content of the first data object and the first density estimation model includes:
embedding, by the computing device using the text embedding module, each text sequence in the text content of the first data object, into a respective vector having the predefined dimension;
correlating, by the computing device, the respective vector for each text sequence in the text content of the first data object to each vector or group of vectors in the first density estimation model to determine an interest score for each text sequence in the first data object; and
determining, by the computing device, the first relevancy score for the first data object based on the interest scores for each text sequence in the text content of the first data object and a frequency that each text sequence is present in the plurality of data objects associated with the plurality of users of the service.

13. The method of claim 9, further comprising:
determining, by the computing device, a vector frequency for each vector based on a text frequency of text sequences in a second set of the plurality of data objects that is associated with a second user;
generating, by the computing device, an interest score for each vector or a group of vectors associated with the second set based on the vector frequency for the second set; and aggregating, by the computing device, the interest scores for the vector or group of vectors for the second set into a second density estimation model associated with the second user.

14. The method of claim 13, further comprising:
determining, by the computing device, that a first condition for a first data object that includes text content and that is associated with the first user has been satisfied;
generating, by the computing device and in response to the first condition for the first data object being satisfied, a first relevancy score for the first data object based on the text content of the first data object and the first density estimation model;
performing, by the computing device and in response to the first relevancy score satisfying a relevancy condition, a first type of action on the first data object;
determining, by the computing device, that a second condition for a second data object that also includes text content and that is associated with the second user has been satisfied;
generating, by the computing device and in response to the second condition for the second data object being satisfied, a second relevancy score for the second data object based on the text content of the second data object and the second density estimation model; and
performing, by the computing device and in response to the second relevancy score not satisfying the relevancy condition, a second type of action on the second data object.

15. A non-transitory machine-readable medium having stored thereon machine-readable instructions executable to cause a machine to perform operations comprising:
determining that a condition for a first data object has been satisfied, wherein the first data object includes text content and is associated with a first user of a service;
generating, in response to the condition for the first data object being satisfied, a first relevancy score for the first data object, wherein the first relevancy score is based on the text content of the first data object and a first density estimation model associated with the first user, and wherein the first density estimation model was generated by:
generating a text object dictionary including text sequences for a plurality of users of the service using a plurality of data objects that each include text content and that are associated with the plurality of users; and
generating a user text-interest matrix that identifies relevancy levels for each text sequence in the text object dictionary for the first user, based on the text content of a first set of the plurality of data objects associated with the first user; and
prioritizing the first data object with respect to at least one of the other data objects of the first set that are associated with the first user based on the first relevancy score.

16. The non-transitory machine-readable medium of claim 15, wherein the condition includes a predetermined time period that the first data object has been stored in a database.

17. The non-transitory machine-readable medium of claim 15, wherein the first density estimation model for the first user is generated further by:
embedding, using a text embedding module, each text sequence in the text content of the plurality of data objects into a vector having a predefined dimension such that text sequences with a semantic similarity are embedded with vectors that have values that satisfy a threshold of similarity;

determining a vector frequency for each vector or group of vectors based on a text frequency of the text sequences in the first set of the plurality of data objects associated with the first user; and generating an interest score for each vector or a group of vectors based on the vector frequency.

18. The non-transitory machine-readable medium of claim 17, wherein the generating the first relevancy score for the first data object based on the text content of the first data object includes:

embedding, using the text embedding module, each text sequence in the text content of the first data object, into a respective vector having the predefined dimension;

correlating the respective vector of each text sequence in the text content of the first data object to each vector or group of vectors in the first density estimation model to determine an interest score for each text sequence in the first data object; and determining the first relevancy score for the first data object based on the interest scores for each text sequence in the text content of the first data object and a frequency that each text sequence is present in the plurality of data objects associated with the plurality of users.

19. The non-transitory machine-readable medium of claim 15, wherein the operations further comprise:

performing, based on a priority of the first data object, an action on the first data object.

20. The non-transitory machine-readable medium of claim 15, wherein the operations further comprise:

determining that a condition for a second data object that includes text content and that is associated with a second user has been satisfied;

generating, in response to the condition for the second data object being satisfied, a second relevancy score for the second data object based on the text content of the second data object and a second density estimation model that was generated using the plurality of data objects and using a second set of the plurality of data objects that are associated with the second user; and performing, in response to the second relevancy score satisfying a relevancy condition, a specific type of action on the first data object.

* * * * *

UNITED STATES PATENT AND TRADEMARK OFFICE
CERTIFICATE OF CORRECTION

PATENT NO. : 11,321,375 B2  
APPLICATION NO. : 16/908187  
DATED : May 3, 2022  
INVENTOR(S) : Itay Margolin and Tomer Handelman Page 1 of 1

It is certified that error appears in the above-identified patent and that said Letters Patent is hereby corrected as shown below:

In the Specification

Column 11, Line 13, change "7040" to -- 704f --

Signed and Sealed this  
Twenty-first Day of June, 2022

Katherine Kelly Vidal  
*Director of the United States Patent and Trademark Office*